United States Patent
Nakada

(10) Patent No.: US 7,738,889 B2
(45) Date of Patent: Jun. 15, 2010

(54) MOBILE COMMUNICATION SYSTEM, BASE STATION, AND COMMUNICATION CONTROL METHOD

(75) Inventor: Suguru Nakada, Tokyo (JP)

(73) Assignee: Nec Corporation, Tokyo (JP)

( * ) Notice: Subject to any disclaimer, the term of this patent is extended or adjusted under 35 U.S.C. 154(b) by 1410 days.

(21) Appl. No.: 10/467,859

(22) PCT Filed: Feb. 13, 2002

(86) PCT No.: PCT/JP02/01182

§ 371 (c)(1),
(2), (4) Date: Dec. 4, 2003

(87) PCT Pub. No.: WO02/065659

PCT Pub. Date: Aug. 22, 2002

(65) Prior Publication Data

US 2004/0077357 A1    Apr. 22, 2004

(30) Foreign Application Priority Data

Feb. 14, 2001    (JP)    ............................. 2001-037525

(51) Int. Cl.
*H04B 7/00*    (2006.01)
(52) U.S. Cl. ........................ 455/506; 375/148; 375/347; 455/137
(58) Field of Classification Search ......... 455/504–506, 455/509–515, 450–452.2, 132–141; 375/148
See application file for complete search history.

(56) References Cited

U.S. PATENT DOCUMENTS 5,818,866 A * 10/1998 Wilk .......................... 375/149

(Continued)

FOREIGN PATENT DOCUMENTS

EP    0 951 148 A2    10/1999

(Continued)

OTHER PUBLICATIONS

Jari H. Linatti, "On the Threshold Setting Principles in Code Acquisition of DSS-SS Signals" Jan. 2000, IEEE Journal on Selected Areas in Communications, vol. 18 No. 1.*

(Continued)

*Primary Examiner*—Nick Corsaro
*Assistant Examiner*—Vladimir Magloire
(74) *Attorney, Agent, or Firm*—Sughrue Mion, PLLC

(57) ABSTRACT

A wireless communication system comprising a transmitting station and a receiving station, and a control method therefore. A mobile station (101) as the transmitting station has a facility for transmitting a preamble signal to a base station (102) as the receiving station before transmission of information data from the mobile station (101) to the base station (102). On the other hand, the base station (102) has a facility for performing path detection by using a signal threshold for the preamble signal received from the mobile station (101), a facility for performing further path detection by using another threshold for the received preamble signal if paths are detected in the path detection, and a facility for setting path information of the paths detected by using the plurality of thresholds for a receiver (206) installed in the base station (102) so as to perform a path diversity reception. In the wireless communication system and the control method therefore, the receiver (206) of the base station (102) receives information data transmitted from the mobile station (101).

62 Claims, 8 Drawing Sheets

U.S. PATENT DOCUMENTS

| | | | |
|---|---|---|---|
| 6,026,115 A * | 2/2000 | Higashi et al. | 375/148 |
| 6,567,482 B1 * | 5/2003 | Popovic' | 375/343 |
| 2001/0008524 A1 * | 7/2001 | Ishii et al. | 370/335 |

FOREIGN PATENT DOCUMENTS

| | | |
|---|---|---|
| EP | 0 989 685 A2 | 3/2000 |
| EP | 1 156 601 A2 | 11/2001 |
| JP | 10-178386 A | 6/1998 |
| JP | 10-336072 A | 12/1998 |
| JP | 2000-312168 A | 11/2000 |
| WO | WO 9818280 A2 | 4/1998 |
| WO | WO 99/41845 A1 | 8/1999 |
| WO | WO 0021320 A1 | 4/2000 |
| WO | WO 00/54424 A2 | 9/2000 |

OTHER PUBLICATIONS

Shi Z-L et al: "Automated threshold control for acquisition in spread spectrum packet radio communication" Proceeding of the International Conference on Communications (ICC). Geneva, May 23-26, 1993, New York IEEE, US, vol. vol. 3, May 23, 1993 pp. 478-482, XP010136947 ISBN: 0-7803-0950-2 *paragraph '0002!*.

* cited by examiner

MOBILE COMMUNICATION SYSTEM, BASE STATION, AND COMMUNICATION CONTROL METHOD

TECHNICAL FIELD

The present invention relates to a mobile communication system and a communication method, more particularly to a method and a constitution of a system and a base station preferably applied to a wireless communication in CDMA (Code Division Multiple Access) using a random access with a preamble signal in an uplink channel from a mobile station to a base station.

BACKGROUND ART

As shown in FIG. 1(a), the RACH comprises a preamble signal 601, a preamble signal 602, and a message signal 603. The preamble signals 601 and 602 are used as signals for conveying a request for authorization of message signal transmission from the mobile station to the base station. The message signal 603 is for use in a practical information transmission. The base station calculates a delay profile from the preamble signal 601 to perform path detection to find a path exceeding a predetermined threshold (power level). Unless the base station is ready to receive a message even if a path is detected as a result of the path detection, the base station transmits an NACK signal 604 indicating a negative acknowledgement (refusal to authorize the message transmission) to the mobile station as shown in FIG. 1(b). The mobile station that has received the NACK signal transmits the preamble signal 602 again and the base station performs path detection. If the base station is then ready to receive the message, the base station transmits an ACK signal 605 indicating an acknowledgment (authorization of the message transmission) to the mobile station. The mobile station that has received the ACK signal 605 effects control so as to transmit the message signal 603. For details of preamble (PRACH), NACK, ACK (MCH) and the like, refer to Section 5.2.2.1 "Physical Random Access Channel (PRACH)" of TS25.211 5.4.0, Section 5.3.3.7 "Acquisition Indicator Channel (AICH)" of TS25.211 5.4.0, or the like of 3GPP (3rd Generation Partnership Project 1; W-CDMA specifications). Furthermore, for details of transmission intervals of PRACH and AICH, refer to Section 7.3 "PRACH/AICH timing relation" of TS25.211 5.4.0. For information about PRACH and AICH protocol and transmission power controls, refer to Chapter 6 "Random access procedure" of TS25.214 5.5.0. For information about code sequences forming a preamble signal, refer to Section 4.3.3 "PRACH preamble codes" of TS25.213 5.3.0. The URL of the 3GPP specifications is "http://www.3gpp.org/ftp/Specs/."

The message signal loaded with data need be received with fewer errors than those of the preamble signal in the base station.

As well known, for example, a rake receiver is used as an error reduction technology in CDMA. A pseudo-noise (PN) sequence for use in a spread spectrum communication causes a peak when code timings match. Upon receiving a direct-sequence spread-spectrum signal (DS signal) under a multi-path environment, a correlation peak corresponding to each of the multipath can be obtained. In other words, in the direct-sequence (DS) spread-spectrum communication, the multi-path can be separated temporally, thus enabling a path diversity reception in which signals having passed through the paths are individually despread and recombined. A receiver in a rake system (referred to as "rake receiver") executing the path diversity reception performs maximum ratio combining of the paths by applying an in-phase step to outputs (branches) of correlators (referred to as "rake fingers") that perform despreading, weighting the branch signals according to signal levels, and summing up the branch signals. The rake receiver typically comprises N correlators 701 to 70N, for example, as shown in FIG. 2. The correlators 701 to 70N perform despreading operations of input signals using a spreading code sequence (PN sequence). The rake receiver performs the maximum ratio combining through combining the results of multiplying outputs of the correlators by weighting factors 711 to 71N according to the signal levels with a combiner (adder) 720 and performs a path diversity in the maximum ratio combining, in which signal powers dispersed due to a delay dispersion of a radio transmission channel is brought together. Note that path delay information (delays #1 to #N) set for the correlators 701 to 70N is requited for the rake reception. Therefore, the correlators 701 to 70N perform an operation of correlation between the input signals and the spreading code sequence on the basis of the set delays #1 to #N. For details of the rake receiver, refer to, for example, Japanese Patent Laid-Open Publication No. 2000-232430.

To obtain delay information, obtain a delay profile at receiving a message signal and detect a position of peak power in the delay profile, in other words, a path position.

This method, however, has a problem of a high processing load though it enables accurate path detection. Furthermore, it has another problem of a delay that occurs since a rake reception cannot be started until the path detection is completed.

Therefore, conventionally there has been provided a method of resolving these problems by utilizing features of RACH. The conventional method is to set a path position detected by using a preamble signal for a rake receiver as path information of a message signal directly. According to the method, a processing load is relatively reduced at receiving the message signal following the preamble signal and a base station has less processing delay.

In general, a threshold of a signal-to-noise ratio for use in preamble signal detection, in other words, a preamble threshold is set to a relatively high value so as to prevent erroneous detection caused by noise or interference effects.

Therefore, the number of paths determined to be detected is apt to be low at preamble signal detection. Even if these paths were set directly for the rake receiver (for example, if the number of paths is far lower than that of rake fingers), an enough gain is not achieved, thus failing to reach a substantial improvement of characteristics.

In addition, if there is a large time difference between a preamble signal transmission and a message signal transmission, a change may occur in a propagation environment, by which it is very possible that a path detected at a preamble signal reception in the base station has been changed at a message signal reception.

Thereafter, if a rake reception of the message signal is started after path setting without taking into consideration the above fluctuation, an enough gain is not achieved, thereby causing frequent errors in received data.

DISCLOSURE OF INVENTION

The present invention has been provided to resolve the above problems in the conventional technology. It is an object of the present invention to provide a method, a system, and a base station for enabling a high-quality signal reception almost without errors by increasing the number of detected paths to secure a high gain in a path diversity receiver.

It is another object of the present invention to provide a method, a system, and a base station enabling a high-quality signal reception almost without errors by capturing a path accurately and maintaining a high signal-to-noise ratio even if a change occurs in a path in such a way that a detected path at a preamble signal reception in a base station differs from a path at a message signal reception.

To achieve the above objects, according to a first aspect of the present invention, there are provided a wireless communication system and a control method therefor, wherein, before transmission of information data from a transmitting station to a receiving station, the receiving station that receives a preamble signal transmitted from the transmitting station performs path detection by using a single threshold for the preamble signal from the transmitting station, performs further path detection by using another threshold for the received preamble signal if the path is detected, and sets path information of the paths detected by using the plurality of thresholds for a receiver installed in the receiving station so as to perform a path diversity reception, and wherein the receiver receives the information data transmitted from the transmitting station.

According to a second aspect of the present invention, there are provided a wireless communication system and a control method therefor, wherein, before transmission of information data from a transmitting station to a receiving station, the receiving station that receives a preamble signal transmitted from the transmitting station performs path detection by using a single threshold for the preamble signal from the transmitting station, sets up one or more append paths before and/or after (on a time basis) at least one path among detected paths if they are detected, and sets information of the detected paths and the append paths for a receiver installed in the receiving station so as to perform a path diversity reception, and wherein the receiver receives the information data transmitted from the transmitting station.

According to a third aspect of the present invention, there are provided a wireless communication system and a control method therefor, wherein a mobile station transmits a preamble signal composed of a plurality of code sequences so as to acquire authorization of message signal transmission, wherein a base station has a plurality of preamble thresholds, detects a path by using a single preamble threshold for a plurality of paths of the received preamble signal, transmits a signal indicating the authorization of message signal transmission to the mobile station if the path is detected, in other words, if any one path has a power level exceeding the preamble threshold and the base station is ready to receive the message signal, detects another path by using another preamble threshold for the paths of the previously received preamble signal subsequently to the transmission of the signal indicating the authorization of message signal transmission, and sets path information of the paths detected by using the plurality of preamble thresholds for a receiver installed in the base station so as to perform a path diversity reception, and wherein the receiver in the base station receives the message signal transmitted from the mobile station.

According to a fourth aspect of the present invention, there are provided a wireless communication system and a control method therefor, wherein a base station transmits a signal indicating authorization of message signal transmission to a mobile station if there is a path having a value exceeding a predetermined preamble threshold on the preamble signal received from the mobile station, sets up one or more append paths before and/or after (on a time basis) at least one path among the detected paths, and sets path information of the append paths and the detected paths for a receiver installed in the base station so as to perform a path diversity reception, and wherein the receiver receives the message signal from the mobile station.

As apparent from the above aspects of the present invention, it is possible to achieve a remarkable effect of realizing a high accuracy of a preamble signal detection and an accurate reception of a message signal by holding a plurality of preamble thresholds.

It is because a single preamble threshold ($\alpha$) is set to a high value in the present invention, thus enabling preamble signal detection with almost no incorrect detection caused by effects of noise components, and a path set for a rake receiver is determined by using another preamble threshold ($\beta$) set to a value lower than the preamble threshold ($\alpha$), thus increasing the number of paths to be set up and enabling a signal-to-noise ratio in the rake receiver to be set to a high value, thereby preventing an occurrence of error.

Furthermore, according to the present invention, append paths are set up before and/or after a path detected at a preamble signal reception before performing a rake reception of a message signal, thereby achieving a remarkable effect of preventing an occurrence of error.

It is because in the present invention even if there is a large time difference between the preamble signal transmission and the message signal transmission in the mobile station and there is some difference between a delay of the path detected at the preamble signal reception and a delay of the path at the message signal reception in the base station, it is possible to capture the path accurately by providing the append paths for the rake reception, thereby enabling a high signal-to-noise ratio and preventing an occurrence of error.

The above and further objects, aspects, and advantages of the present invention will be apparent to those skilled in the art from the following detailed description of preferred embodiments provided as examples conforming to the principle of the present invention and the description taken in connection with the accompanying drawings.

BEST MODE FOR CARRYING OUT THE INVENTION

Figure 1A:
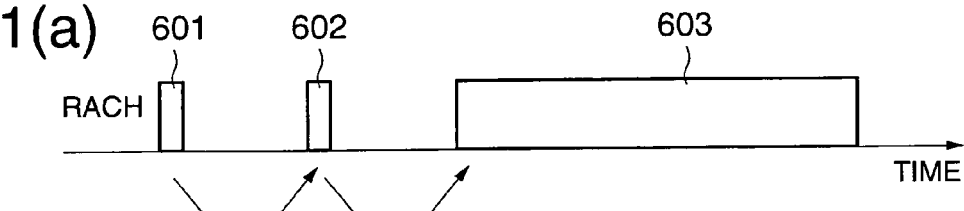
FIG. 1 is a diagram showing an example of a conventional random access, in which diagram (a) shows transmission in a mobile station and diagram (b) shows transmission in a base station.
Figure 1B:

Preferred embodiments of the present invention will be described below. The present invention is preferably embodied in a mobile communication system in CDMA (Code Division Multiple Access) using a random access in one of up link channels from a mobile station to a base station. In this embodiment, the mobile station comprises means for transmitting a preamble signal composed of a plurality of code sequences to acquire authorization of message signal transmission and means for transmitting the message signal to the base station upon receiving a signal indicating the authorization of message signal transmission from the base station. Further the base station comprises means for performing threshold processing for a preamble signal detection by using a single preamble threshold from a delay profile of the preamble signal received from the mobile station for a plurality of paths, means for determining that the preamble signal is detected if any one path has a power level exceeding the single preamble threshold as a result of the threshold processing for the preamble signal detection and for transmitting a signal indicating the authorization of the message signal to the mobile station if the base station is ready to receive the message signal, means for performing threshold processing for a path allocation by applying another preamble threshold to the paths of the previously received preamble signal following the transmission of the signal indicating the authorization of message signal transmission, and means for setting information of paths (delays of the paths) allocated as a result of the threshold processing for a receiver for performing a path diversity reception (namely, correlators (rake fingers) of a rake receiver); the base station performs a rake reception of the message signal from the mobile station.

Otherwise, in another embodiment of the present invention, if there is a path having a value exceeding a predetermined preamble threshold on a preamble signal received from the mobile station and the base station is ready to receive a message signal, the base station may comprise means for transmitting a signal indicating authorization of message signal transmission to the mobile station and means for setting information of paths detected at a preamble signal reception with one or more append paths set up before or after (on a time basis) the detected paths (information of the detected paths and the append paths) for a rake receiver used by the message signal reception.

The present invention having the above constitution enables a CDMA (Code Division Multiple Access) system for use in a land mobile communication (mobile communication) system to receive a message signal having information almost without errors at a receiving end when performing a random access using a preamble signal.

In still another embodiment, it is possible to combine the embodiment in which the base station detects a path by using a plurality of preamble thresholds and the embodiment in which the base station sets the information of the paths detected at the preamble signal reception with append paths set up before and/or after the detected paths for the rake receiver. In other words, at the preamble signal reception, append paths may be provided before and/or after the path detected by using the single preamble threshold at the preamble signal detection, another path detection may be performed by using another lowered preamble threshold for a message signal reception, the preamble threshold may be lowered to perform path detection, and path information of the detected paths and the append paths may be set for a receiver for performing a path diversity reception.

Similarly, if a path is detected by using a first preamble threshold for a preamble signal at the preamble signal detection, another path detection for a message signal reception may be performed by using a second preamble threshold, one or more append paths may be set up before and/or after (on a time basis) the paths detected by using the second preamble threshold, and information of the paths detected by using the second preamble threshold and the append paths may be set for a receiver (rake receiver) for performing a path diversity reception.

Figure 3:
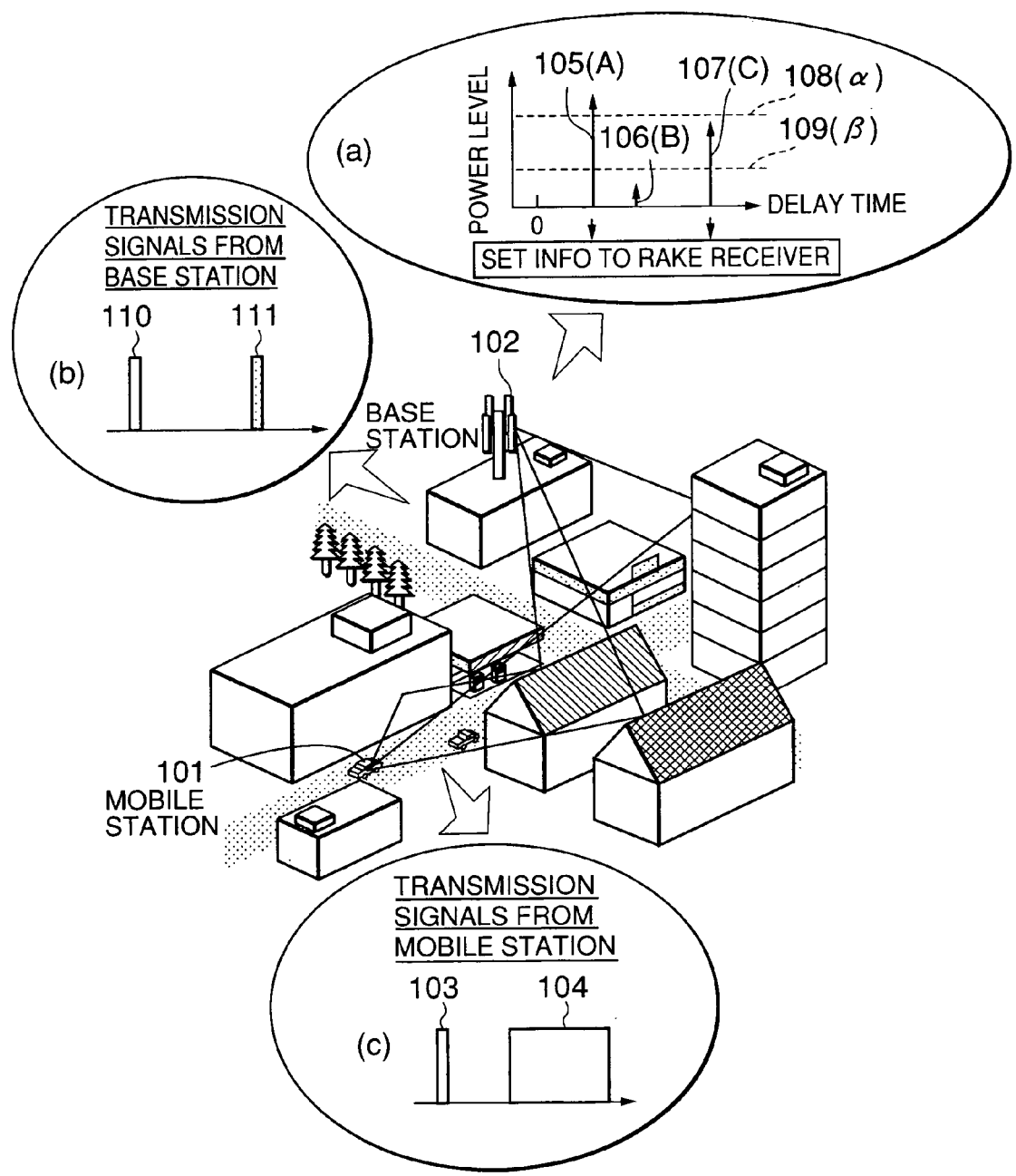
FIG. 3 is a view showing a frame format of a system configuration according to a first embodiment of the present invention, in which diagram (a) shows power levels of a received preamble signal, diagram (b) shows transmission signals from the base station, and diagram (c) shows transmission signals from a mobile station.

The above embodiments of the present invention will be described below by referencing the appended drawings so as to provide more detailed description. Referring to FIG. 3, there is shown a view for explaining an outline of the first embodiment of the system according to the present invention, illustrating a constitution in which the present invention is embodied in a CDMA mobile communication system.

In FIG. 3, a mobile station 101 transmits a preamble signal 103 composed of a plurality of code sequences to acquire authorization of message signal transmission. In an urban area or the like environment, a plurality of radio wave propagation paths exist until a base station 102 and therefore the preamble signal 103 received at the base station 102 has a plurality of power peaks (paths) on a time basis (See diagram (a) of FIG. 3). The paths are assumed to be path 105(A), path 106(B), and path 107(C). The diagram (a) of FIG. 3, in which a horizontal axis represents a delay time and a vertical axis represents a power level, corresponds to a delay profile.

The base station 102 has two thresholds, namely, a preamble threshold 108 ($\alpha$) and a preamble threshold 109 ($\beta$) (the preamble threshold $\alpha \geq$ the preamble threshold $\beta$) and determines whether the preamble signal 103 is detected by using the preamble threshold 108 ($\alpha$), first, for the plurality of paths of the received preamble signal.

In this embodiment, the preamble threshold 108 ($\alpha$) and the preamble threshold 109 ($\beta$) can be previously stored and retained as fixed values in a storage device in advance. In other words, the preamble threshold 108 ($\alpha$) and the preamble threshold 109 ($\beta$) are appropriately set to optimum values through a test or the like according to an environment where the base station 102 is located (installation location or surrounding environment) before they are stored in the storage device. Otherwise, the preamble threshold 109 ($\beta$) can be calculated by subtracting an offset from the preamble threshold 108 ($\alpha$) Still otherwise, the preamble threshold, 109 ($\beta$) can be variably defined by using the preamble threshold 108 ($\alpha$) and a function f based on a cell radius or a surrounding environment condition C (in other words, $\beta = f(\alpha, C)$). Furthermore, the preamble threshold 108 ($\alpha$) can be varied according to an environment condition.

In determining whether the preamble signal 103 is detected, if any one path has a power level exceeding the preamble threshold 108 ($\alpha$), the base station 102 determines that the preamble signal 103 is detected and transmits an ACK signal 110 indicating authorization of message signal transmission to the mobile station 101. In the example shown in the diagram (a) of FIG. 3, a path 105(A) is detected.

Note that, however, even if the preamble signal 103 is detected in the determination of whether the preamble signal 103 is detected at the base station 102, the ACK signal 110 is not always transmitted from the base station 102 to the mobile station 101. In other words, if the base station 102 does not have an enough capacity to receive the message signal 104 (for example, a rake receiver or any other resource) when the path is detected, the base station 102 transmits a NACK signal 111 indicating a refusal of authorization of the message signal transmission to the mobile station 101. The base station has a plurality of rake receivers corresponding to a plurality of TRXs (transmission receivers). Formats of the ACK signal 110 and the NACK signal 111 used in this embodiment conform to 3GPP specifications TS25.211 5.4.0, Section 5.3.3.7 AICH (Acquisition Indication Channel) or the like.

The mobile station 101 that has received the ACK signal 110 transmits a message signal 104. The message signal 104 reaches the base station 102, passing through the same radio wave propagation path as for the preamble signal 103.

Figure 2:
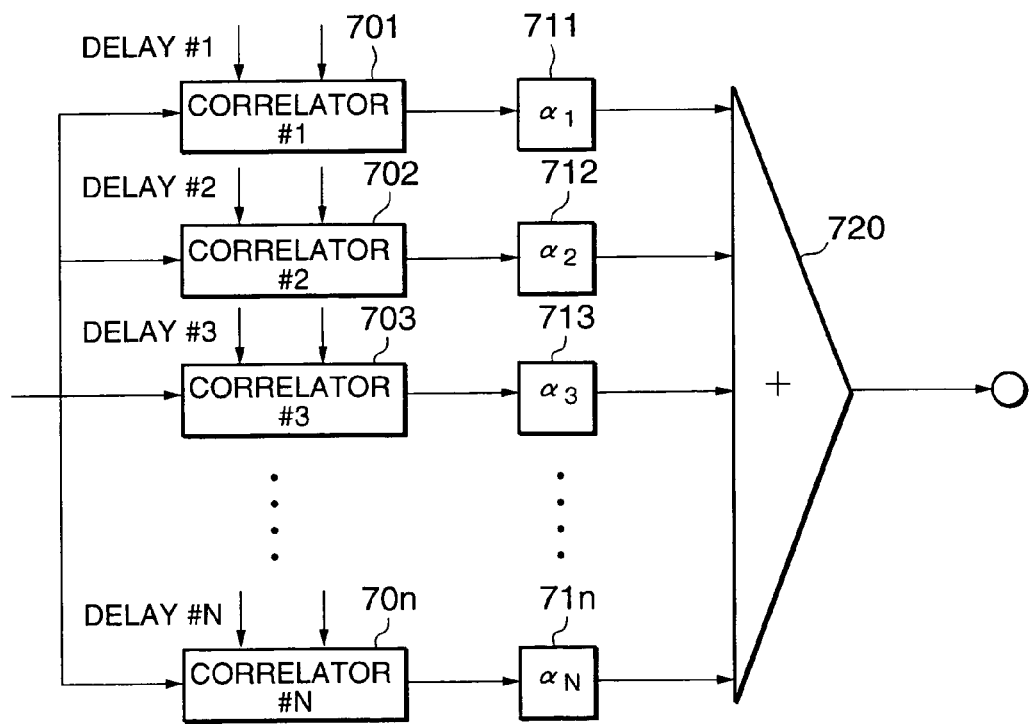
FIG. 2 is a diagram showing an example of a configuration of a conventional rake receiver.

The base station 102 performs threshold processing by applying the preamble threshold 109 ($\beta$) to paths of the previously received preamble signal 103, sets information of the path (delay) clearing the threshold for the rake receivers, and receives the message signal 104. The rake receiver may have a configuration, for example, as shown in FIG. 2, in which delays of the correlators are set on the basis of the information of the paths (delays), a weighting factor is set according to a level, and a path diversity reception of the message signal 104 is performed with the maximum combined ratio.

Figure 4:
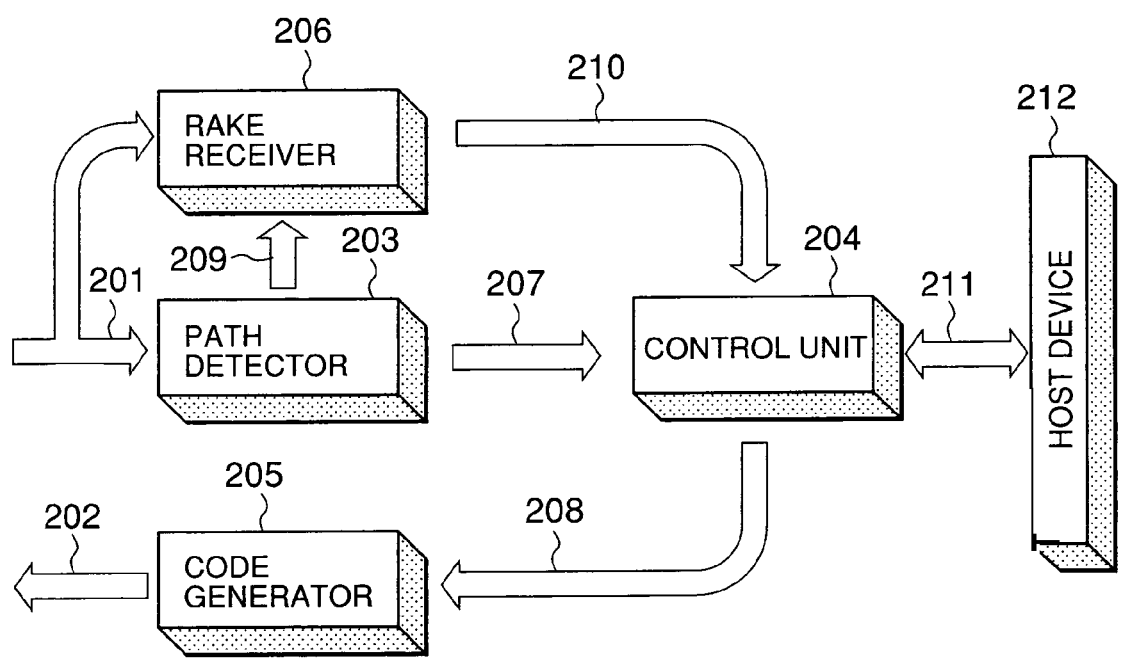
FIG. 4 is a block diagram showing a configuration of the base station according to the first embodiment of the present invention.

Referring to FIG. 4, there is shown a block diagram of a configuration of a base band signal processing unit in the base station 102 in FIG. 3.

An output from a code generator 205 is a transmitted baseband signal 202 before being modulated by a modulator (not shown).

An output from a code generator 207 is a transmitted baseband signal 202 before being modulated by a modulator (not shown).

The path detector 203, first, measures a cross correlation between the input received baseband signal 201 and code sequences forming a preamble signal 103 previously determined to be used with the mobile station 101 and detects as a path a portion where a correlation value is the maximum, in other words, where the power level is the maximum (peak).

For detected paths, the path detector 203 performs threshold processing (extracting a path whose peak exceeds the preamble threshold 108 ($\alpha$)) by using the preamble threshold 108 ($\alpha$) and notifies a control unit 204 of a result of the threshold processing as preamble signal detection information 207.

The control unit 204 communicates with a host device 212 by exchanging control information and send/receive data 211, while receiving the preamble signal detection information 207 and transmitting code generation information 208 to the code generator 205.

The code generator 205 generates code sequences forming the ACK signal 110 or the NACK signal 111 and transmits it as a transmitted baseband signal 202 to a modulator.

Subsequently, the path detector 203 performs threshold processing for the detected paths again by using the preamble threshold 109 ($\beta$) and notifies the rake receiver 206 of the path information 209 (path delays) of the paths clearing the threshold.

The rake receiver 206, having a configuration, for example, as shown in FIG. 2, sets path information 209 (delays) for correlators (one or more correlators among the correlators 701 to 70N in FIG. 2) forming the rake receiver 206, demodulates the message signal 104 from the received baseband signal 201, and transmits it as message data 210 to the control unit 204.

Figure 5:
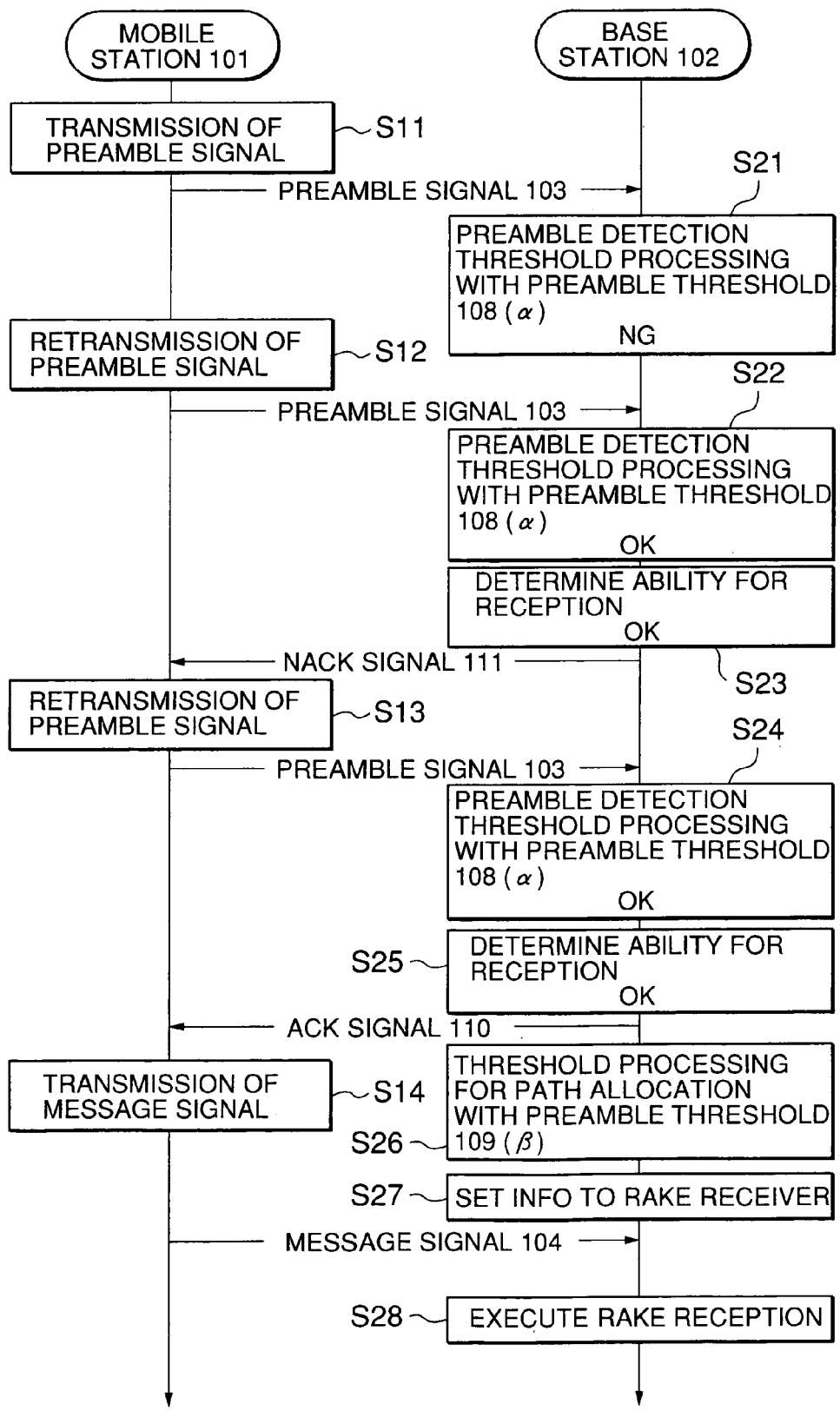
FIG. 5 is a diagram showing a processing sequence according to the first embodiment of the present invention.

The following describes an operation of the system according to this embodiment shown in FIG. 3 by referencing a processing sequence diagram shown in FIG. 5.

First, if a demand occurs for performing a random access in the mobile station 101, the mobile station 101 performs preamble signal transmission (step S11) and transmits the preamble signal 103 to the base station 102.

The base station 102 performs preamble detection threshold processing by using the preamble threshold 108 ($\alpha$) (step S21). If each of reception power levels of the paths of the preamble signal 103 is lower than or equal to the preamble threshold 108 ($\alpha$) no particular signal is transmitted as response.

If there is no response from the base station 102 after an elapse of a certain period of time after transmitting the preamble signal 103, the mobile station 101 performs preamble signal retransmission (step S12) to transmit the preamble signal 103 again. Transmission intervals of the preamble signal 103, controls of its transmission power, and the like should conform to 3GPP specifications.

The base station 102 performs the preamble detection threshold processing again (step S22). If a path having a power level exceeding the preamble threshold 108 ($\alpha$) is detected, the base station 102 handles it as a detection of the preamble signal and subsequently makes a determination of ability for reception (step S23).

In the determination of ability for reception, it is determined whether the base station 102 has an enough processing ability to receive a message signal 104 (for example, whether there is a free rake receiver among the plurality of rake receivers included in the base station 102). Unless the base station 102 cannot receive the message signal 104, it transmits an NACK signal 111.

Upon receiving the NACK signal 111, the mobile station 101 executes preamble signal retransmission again (step S13).

On the other hand, if the base station 102 can receive the message signal 104 from the mobile station 101, it transmits an ACK signal 110 to the mobile station 101 (step S24 and S25).

Upon receiving the ACK signal 110, the mobile station 101 starts message signal transmission (step S14).

The base station 102 executes threshold processing for path allocation by using the preamble threshold 109 ($\beta$) subsequently to the transmission of the ACK signal 110 (step S26).

For example, as shown in FIG. 3, if the base station 102 detects three paths: the path 105(A), the path 106(B), and the path 107(C), the path B106(B) is excluded from the result of the path detection since its power level is lower than or equal to the preamble threshold 109 ($\beta$) by performing threshold processing using the preamble threshold 109 ($\beta$) and therefore the path 105(A) and the path 107(C) are detected as paths to be set for the rake receiver.

Subsequently, the base station 102 sets information (delay time) of the detected paths to the rake receiver (step S27) and executes a path diversity reception (rake reception) of the message signal 104 transmitted from the mobile station 101 (step S28).

Figure 6:
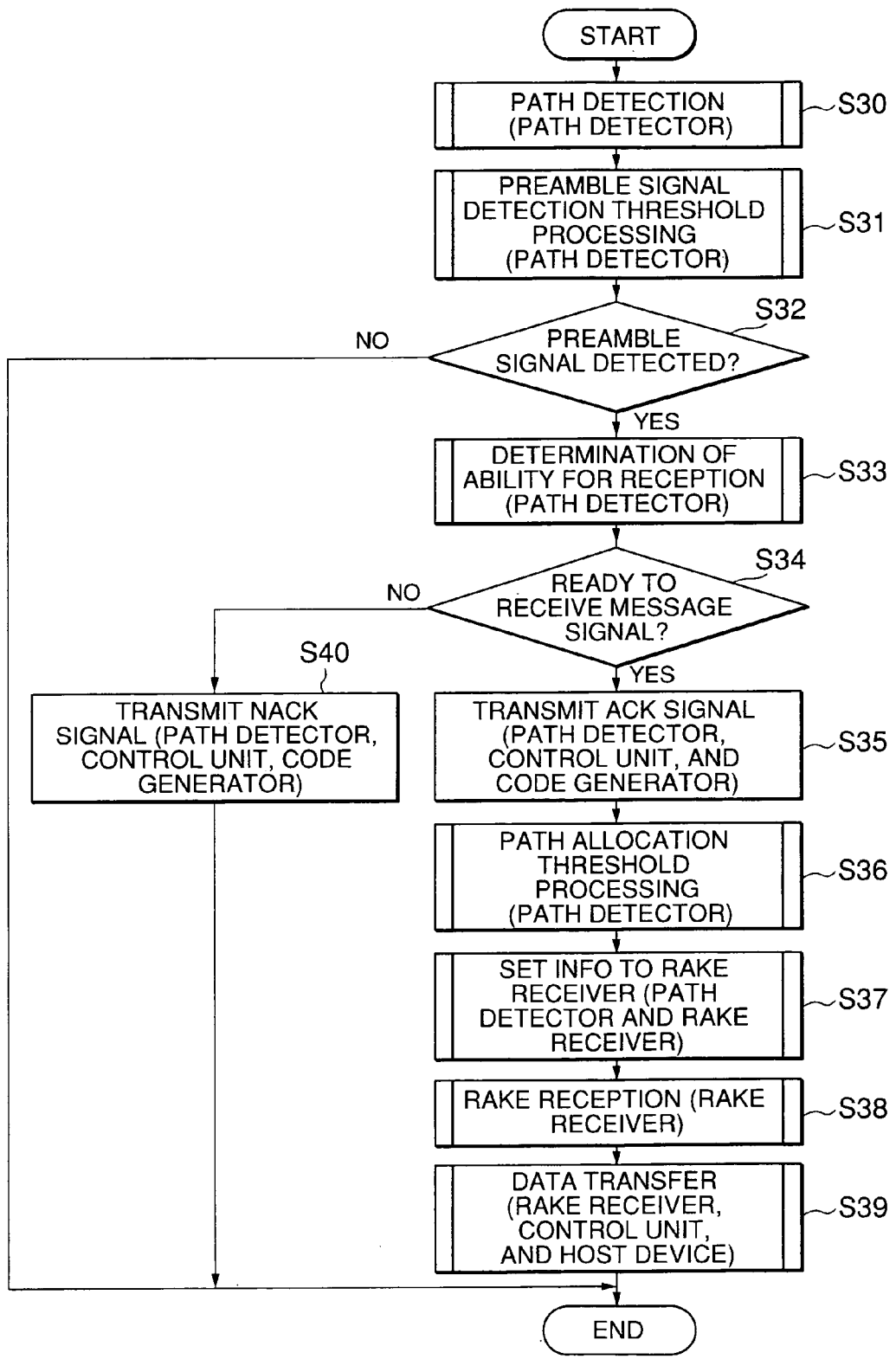
FIG. 6 is a flowchart for explaining an operation in the base station according to the first embodiment of the present invention.

Referring to FIG. 6, there is shown a flowchart for explaining an operation of a baseband signal processing unit in the base station shown in FIG. 4. The operation of the baseband signal processing unit in the base station will be described below with reference to the flowchart in FIG. 6.

In FIG. 4, the demodulated received baseband signal 201 is input to the path detector 203, first.

The path detector 203 calculates a time cross correlation between the received baseband signal 201 and a specific code sequence pattern forming the preamble signal 103 to calculate a delay where a correlation value (power level) is the maximum, in other words, a path delay time (step S30).

The path detector 203 further performs preamble signal detection threshold processing by using the preamble threshold 108 ($\alpha$) for the obtained paths (step S31). If there is any one path having a power level exceeding the preamble threshold 108 ($\alpha$) the path detector determines that the preamble signal 103 is detected (step S32). Unless the preamble signal 103 is detected (branch NO in step S32), the processing ends here.

If the preamble signal 103 is detected, determination of ability for reception is subsequently made (step S33).

In the determination of ability for reception, it is determined whether the base station 102 is ready to receive a message signal (step S34).

If it is ready, the path detector 203 transmits preamble signal detection information 207 "preamble detected and ready to receive message signal" to the control unit 204. The control unit 204 further transmits code generation information 208 instructing the code generator 205 to generate codes forming an ACK signal to the code generator 205.

Unless the base station 102 is ready to receive the message, the path detector transmits preamble signal detection information 207 "preamble detected, but not ready to receive message signal" to the control unit 204. Subsequently, the control unit 204 transmits code generation information 208 instructing the code generator 205 to generate codes forming an NACK signal to the code generator 205.

The code generator 205 generates codes on the basis of the received code generation information 208 and outputs them as a transmitted baseband signal 202 to the modulator. In step S35 and step S40, the ACK signal and the NACK signal are transmitted.

After transmitting the preamble signal detection information 207 "preamble detected and ready to receive message signal" to the control unit 204, the path detector 203 performs path allocation threshold processing by using the preamble threshold 109 ($\beta$) (step S36).

The path detector 203 detects a path having a power level exceeding the preamble threshold 109 ($\beta$) and notifies the rake receiver 206 of delay time of all detected paths as path information 209 (step S37).

The rake receiver 206 sets the notified path information 209 to the correlators forming the rake receiver and executes a rake reception of the message signal (step S38). Message data 210 obtained in the rake reception is transmitted to the host device 212 via the control unit 204 (step S39).

The present invention is not limited to the constitution of the above embodiment, but it is applicable to a system as described below.

The system can be of an autonomous distributed control, which is not a control in the base station (for example, a wireless LAN such as an ad-hoc LAN) or can be an indoor wireless system. It is not limited to CDMA as a wireless mode, but can be a system with a DS mode or other spread spectrum communication technologies. In addition, the present invention is applicable to transmission between terminals (stations) for digital broadcasting in OFDM (orthogonal frequency division multiplexing) based on multi-carrier transmission or COFDM (coded OFDM).

Furthermore, it is also possible to set preamble thresholds more than 2 (for example, 3, 4, or the like) and to set path information of a path clearing a plurality of preamble thresholds to a rake receiver. As set forth in the above, the preamble thresholds can be set adaptively or variably, instead of set as a fixed value.

According to the first embodiment of the present invention, at least two preamble thresholds are provided, thereby enabling a high accuracy of detecting a preamble signal and an accurate reception of a message signal. In other words, preamble threshold $\alpha$ is set to a high value, by which a preamble signal can be detected almost without incorrect detection caused by an effect of noise components. Furthermore, paths to be set for the rake receiver can be determined by using a preamble threshold $\beta$ set to a value lower than the preamble threshold $\alpha$, by which the number of paths to be set can be increased and a high value can be set to a signal-to-noise ratio in the rake receiver, thereby preventing an occurrence of error.

Figure 7:
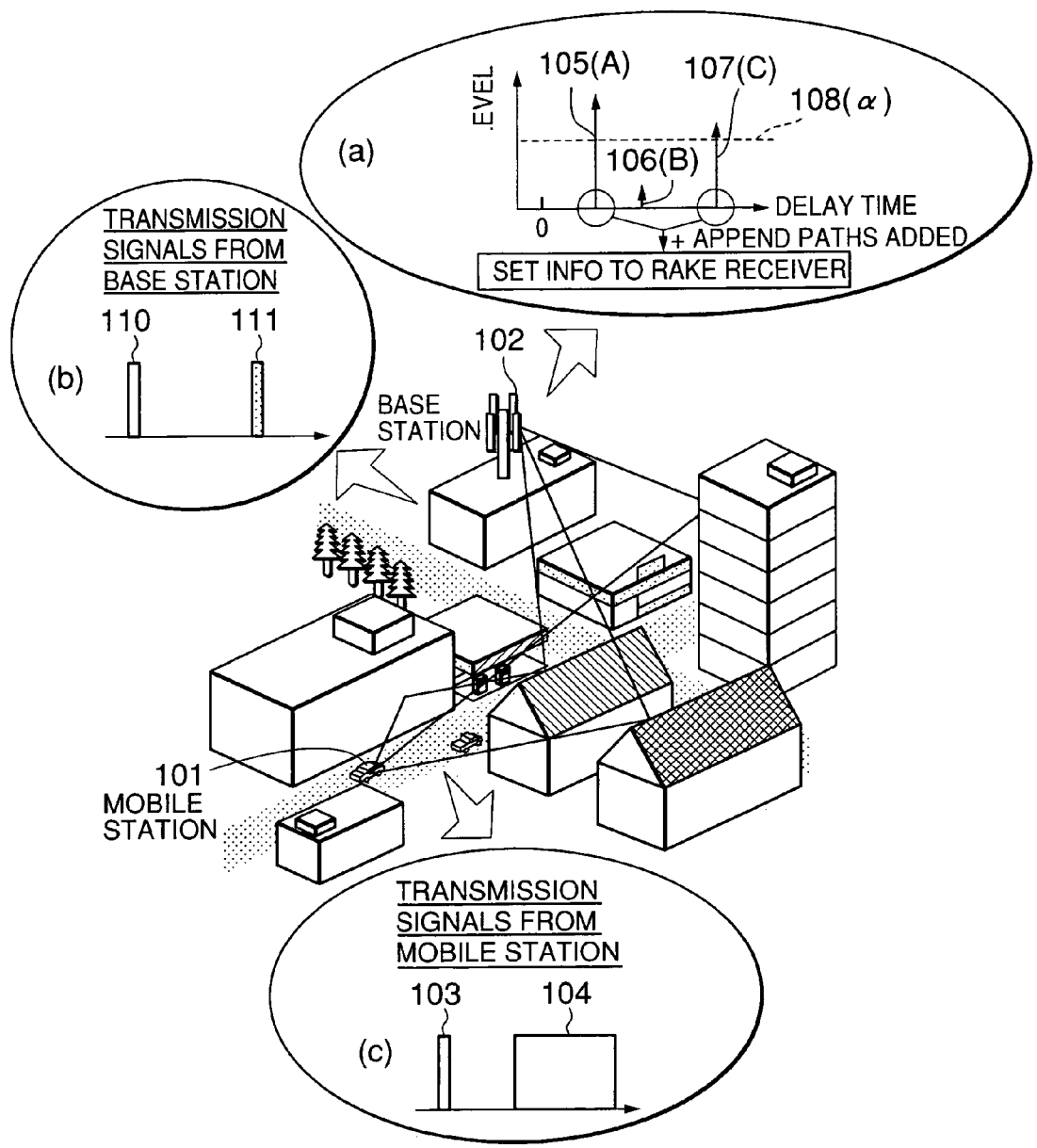
FIG. 7 is a view showing a frame format of a system configuration according to a second embodiment of the present invention, in which diagram (a) shows power levels of a received preamble signal at a base station, diagram (b) shows transmission signals from the base station, and diagram (c) shows transmission signals from a mobile station.

Subsequently, a second embodiment of the present invention will be described below. Referring to FIG. 7, there is shown a diagram of a system configuration according to the second embodiment of the present invention. The present invention is applied to a CDMA mobile communication system. It has basically the same configuration as one in FIG. 3, except that one preamble threshold 108 is provided in a base station 102.

A mobile station 101 transmits a preamble signal 103 indicating a request for authorization of message signal transmission. The preamble signal 103 reaches the base station 102, passing through a plurality of different propagation paths. Therefore, the preamble signal 103 received by the base station 102 has a plurality of power peaks (paths) on a time basis.

The base station 102 has a preamble threshold 108 ($\alpha$). If there is a path having a value exceeding the preamble threshold 108 ($\alpha$), the base station 102 transmits an ACK signal 110 indicating authorization of message signal transmission to the mobile station 101.

Upon receiving the ACK signal 110, the mobile station 101 transmits a message signal 104 to the base station 102.

The base station 102 sets information of append paths for providing against path variation to a rake receiver in addition to information of the detected paths of the previously received preamble signal 103 and then receives the message signal 104 from the mobile station 101.

If there is a large time difference between a start of the preamble signal transmission and that of the message signal transmission, a delay of the path detected at receiving the preamble signal may have changed at receiving the message signal.

Therefore, in the second embodiment of the present invention, append paths are provided-before and after the path detected at receiving the preamble signal and they are set for the rake receiver, by which path variation, if any, does not cause the signal-to-noise ratio to decrease, thus enabling the message signal reception and preventing an occurrence of error.

Referring to FIG. 7, the mobile station 101 transmits the preamble signal 103 composed of a plurality of code sequences to acquire authorization of message signal transmission. In an urban area or the like environment, a plurality of radio wave propagation paths exist until the base station 102 and therefore the preamble signal 103 received at the base station 102 has a plurality of power peaks (paths) on a time basis. The paths are assumed to be path 105(A), path 106(B), and path 107(C).

The base station 102 has the preamble threshold 108 ($\alpha$) and determines whether the preamble signal 103 is detected by using the preamble threshold 108 (α) for the plurality of paths of the received preamble signal.

If any one path has a power level exceeding the preamble threshold 108 (α), the base station 102 determines that the preamble signal 103 is detected and transmits an ACK signal 110 indicating authorization of message signal transmission to the mobile station 101. Note that, however, even if the preamble signal 103 is detected here, the ACK signal 110 is not always transmitted to the mobile station 101. If the base station 102 does not have an enough capacity to receive the message signal 104 at that time, the base station 102 transmits a NACK signal 111 indicating a refusal of authorization of the message signal transmission to the mobile station 101.

Upon receiving the ACK signal 110, the mobile station 101 transmits the message signal 104 to the base station 102.

The base station 102 prepares append paths as shown in FIG. 4 in addition to the paths of the previously received preamble signal 103, sets them for the rake receiver, and receives the message signal 104.

A block configuration of a baseband signal processing unit inside the base station 102 shown in FIG. 7 is basically the same as one in FIG. 4. An input to a path detector 203 and a rake receiver 206 is a received baseband signal 201 demodulated by a demodulator (not shown). An output from a code generator 207 is a transmitted baseband signal 202 before being modulated by a modulator (not shown).

The path detector 203, first, measures a cross correlation between the input received baseband signal 201 and code sequences forming a preamble signal 103 previously determined to be used with the mobile station 101 and detects as a path a portion where a correlation value, namely, the power level is the maximum.

For detected paths, the path detector 203 performs threshold processing by using the preamble threshold 108 (α) and notifies a control unit 204 of a result of the threshold processing as preamble signal detection information 207.

The control unit 204 communicates with a host device 212 by exchanging control information and send/receive data 211, while receiving the preamble signal detection information 207 and transmitting code generation information 208 to a code generator 205.

The code generator 205 generates code sequences forming the ACK signal 110 or the NACK signal 111 and transmits it as a transmitted baseband signal 202 to a modulator.

Subsequently, the path detector 203 adds append paths to the path clearing the threshold determination and notifies the rake receiver 206 of the path information 209.

The rake receiver 206 sets path information 209 to correlators forming the rake receiver 206, demodulates the message signal 104 from the received baseband signal 201, and transmits it as message data 210 to the control unit 204.

Figure 9:
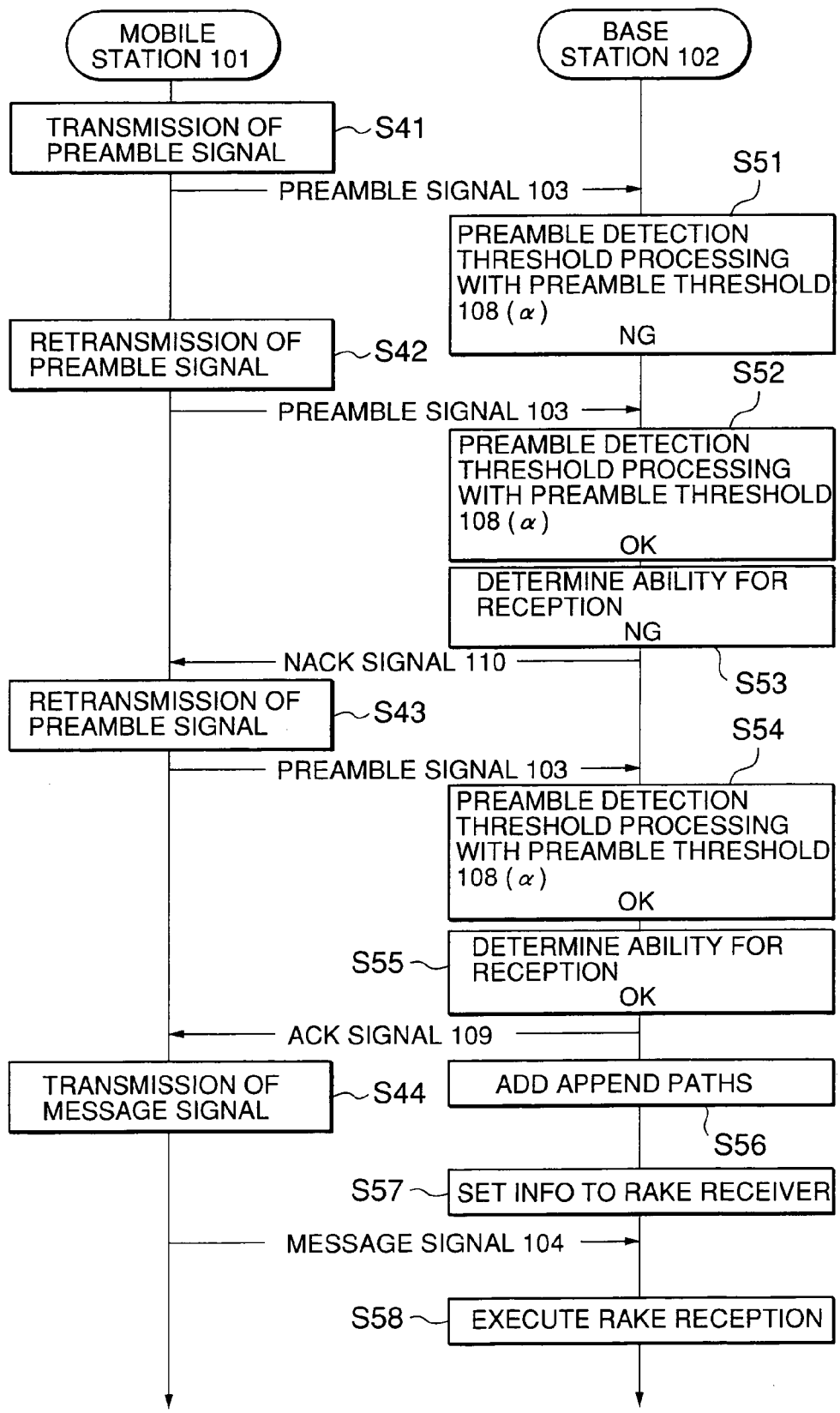
FIG. 9 is a diagram showing a processing sequence according to the second embodiment of the present invention.

Referring to FIG. 9, there is shown a diagram of a processing sequence of the second embodiment according to the present invention. The following describes an operation of the second embodiment according to the present invention by referencing FIG. 9.

First, if a demand occurs for performing a random access in the mobile station 101, the mobile station 101 performs preamble signal transmission (step S41) to transmit the preamble signal 103 to the base station 102.

The base station 102 performs preamble detection threshold processing by using the preamble threshold 108 (α) (step S51). If each of reception power levels of the paths of the preamble signal 103 is lower than or equal to the preamble threshold 108 (α) no particular signal is transmitted as response.

If there is no response from the base station 102 after an elapse of a certain period of time after transmitting the preamble signal 103, the mobile station 101 performs preamble signal retransmission (step S42) to transmit the preamble signal 103 again.

The base station 102 performs the preamble detection threshold processing again (step S52). If a path having a power level exceeding the preamble threshold 108 (α) is detected, the base station 102 handles it as a detection of the preamble signal and subsequently makes determination of ability for reception (step S53). In the determination of ability for reception, it is determined whether the base station 102 has an enough processing ability to receive the message signal 104.

Unless it is ready to receive the message signal 104, the base station 102 transmits an NACK signal 111.

Upon receiving the NACK signal 111, the mobile station 101 performs preamble signal retransmission again (step S43).

On the other hand, if the base station 102 is ready to receive the message signal 104, it transmits an ACK signal 110 (step S54 and S55).

Upon receiving the ACK signal 110, the mobile station 101 starts message signal transmission (step S44).

The base station 102 adds append paths as a preliminary step toward setting paths to the rake receiver subsequently to the transmission of the ACK signal 110 (step S56).

At this point, it is assumed that two paths, namely, path 105 (A) and path 107 (C) clear the threshold processing as shown in FIG. 7 in the base station 102.

Figure 8:
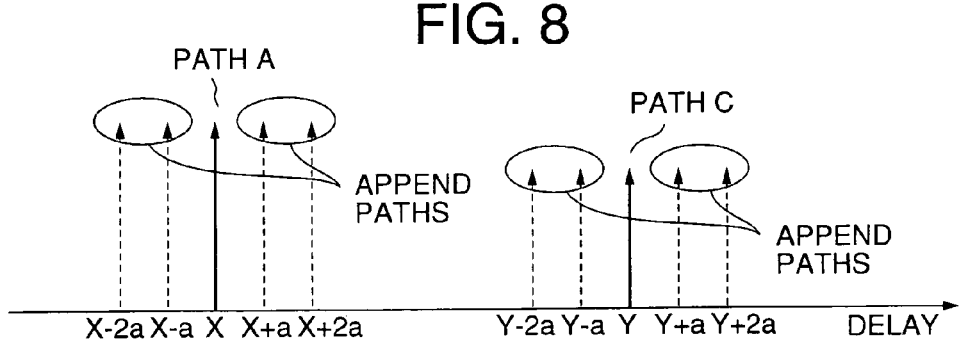
FIG. 8 is a diagram for explaining an example of append path settings according to the second embodiment of the present invention.

In this case, as shown in FIG. 8, append paths are set at positions corresponding to delays of ±a and ±2a for the path 105 (A) and the path 107 (C), respectively, where a is a constant.

Subsequently, the base station 102 sets delay information of the path 105 (A) and the path 107 (C) clearing the threshold and the append paths to the rake receiver (step S57) and executes a rake reception of the message signal 104 transmitted from the mobile station 101 (step S58).

Figure 10:
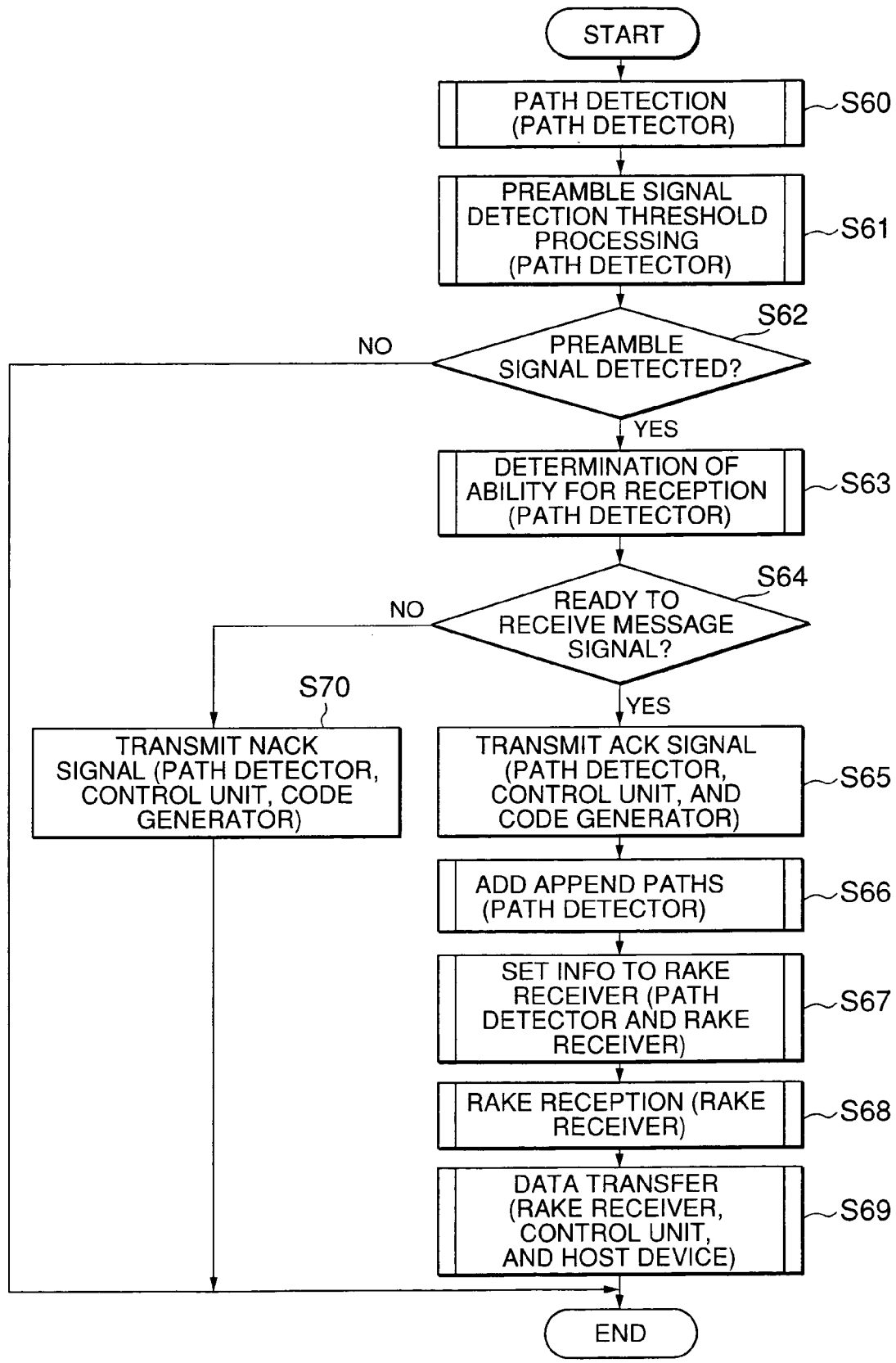
FIG. 10 is a flowchart for explaining an operation in the base station according to the second embodiment of the present invention.

Referring to FIG. 10, there is shown a flowchart for explaining an operation of the baseband signal processing unit (See FIG. 4) in the base station (See FIG. 7) according to the second embodiment of the present invention. The operation of the baseband signal processing unit in the base station 102 in the second embodiment of the present invention will be described below with reference to FIG. 10 and FIG. 4.

In FIG. 4, the demodulated received baseband signal 201 is input to the path detector 203, first.

The path detector 203 calculates a time cross correlation between the received baseband signal 201 and a specific code sequence pattern forming the preamble signal 103 to calculate a delay where a correlation value (power level) is the maximum, in other words, a path delay time (step S60).

The path detector 203 further performs preamble signal detection threshold processing by using the preamble threshold 108 (α) for the obtained paths (step S61). If there is any one path having a power level exceeding the preamble threshold 108 (α) the path detector determines that the preamble signal 103 is detected (step S62). Unless the preamble signal 103 is detected, the processing ends here. If it is detected, however, determination of ability for reception is subsequently made.

In the determination of ability for reception (step S63), it is determined whether the base station 102 is ready to receive a message signal 104.

If it is ready, the path detector 203 transmits preamble signal detection information 207 "preamble detected and ready to receive message signal" to the control unit 204. The control unit 204 further transmits code generation information 208 instructing the code generator 205 to generate codes forming an ACK signal to the code generator 205.

Unless the base station 102 is ready to receive the message, the path detector transmits preamble signal detection information 207 "preamble detected, but not ready to receive message signal" to the control unit 204. Subsequently, the control unit 204 transmits code generation information 208 instructing the code generator 205 to generate codes forming an NACK signal to the code generator 205.

The code generator 205 generates codes on the basis of the received code generation information 208 and outputs them as a transmitted baseband signal 202 to the modulator. In step S65 and step S70, the ACK signal and the NACK signal are transmitted.

After transmitting the preamble signal detection information 207 "preamble detected and ready to receive message signal" to the control unit 204, the path detector 203 adds append paths to the paths having power levels exceeding the preamble threshold 108 (a) (step S66).

Thereafter, the path detector 203 notifies the rake receiver 206 of path information 209 such as delays of the detected paths and the append paths. The rake receiver 206 sets the notified path information 209 to the correlators forming the rake receiver (step S67) and executes a rake reception of the message signal (step S68).

Message data 210 obtained in the rake reception is transmitted to the host device 312 via the control unit 204 (step S69).

The present invention is not limited to the constitution of the above embodiment, but it is applicable to a system as described below.

The system can be of an autonomous distributed control, which is not a control in the base station (for example, a wireless LAN such as an ad-hoc LAN) or can be an indoor wireless system. It is not limited to CDMA as a wireless mode, but can be a system with a DS mode or other spread spectrum communication technologies. In addition, the present invention is applicable to transmission between terminals (stations) for digital broadcasting in OFDM (orthogonal frequency division multiplexing) based on multi-carrier transmission or COFDM (coded OFDM).

Furthermore, it is also possible to set append paths as follows. The number of append paths to be appended is not limited to 4 for a single path.

Intervals (delays) between append paths need not be fixed.

Append paths appended to a single path can be asymmetrical about the path. In other words, the append paths may be appended only before the path or only after the path, asymmetrically appended about the path (the number of appended paths is not uniform), or the like. For example, if the mobile station and the base station are coming relatively close to each other or getting relatively far to each other, the append paths appended before and after the path are assumed to be asymmetrical.

The number or intervals of append paths can vary adaptively according to a propagation environment.

The number or positions of append paths to be appended can vary according to the detected path.

According to the second embodiment of the present invention, append paths are provided before and after a path detected at receiving a preamble signal for performing a rake reception of a message signal, thereby preventing an occurrence of error. In other words, since there is a large time difference between a preamble signal transmission and a message signal transmission in the mobile station, the path can be accurately captured by providing the append paths for a rake reception even if there is any difference between a delay of the path detected at receiving the preamble signal and a delay of the path at receiving the message signal in the base station. Consequently, a high signal-to-noise ratio is obtained, thus preventing an occurrence of error.

Although present invention has been described in the context of the first and second embodiments hereinabove, the present invention can naturally be provided with the functions in both of the first and second embodiments.

More specifically, an example is given below regarding the present invention having the functions of the first embodiment in which a path is detected by using a plurality of preamble thresholds $\alpha$ and $\beta$ and the second embodiment in which append paths are provided before and/or after a path detected at receiving a preamble signal. A base station 102 can provide append paths (additional paths) before and/or after a path detected by using a single preamble threshold $\alpha$, perform path detection by using another preamble threshold $\beta$, and set path information of the detected paths and the append paths to a rake receiver.

Otherwise, if a path is detected by using the preamble threshold $\alpha$ for the preamble signal, the base station 102 can further perform path detection by using the preamble threshold $\beta$, set up one or more append paths before and/or after (on a time basis) at least one path among paths detected by using the plurality of thresholds $\alpha$ and $\beta$, and set path information of the path detected by using the plurality of thresholds $\alpha$ and $\beta$ and the append paths to a rake receiver.

The invention claimed is:

1. In a receiving station for receiving a preamble signal transmitted from a transmitting station before transmission of information data from said transmitting station to said receiving station, a communication control method comprising:
    performing path detection by comparing each of a plurality of paths of the preamble signal with a single threshold for the preamble signal from said transmitting station, wherein the single threshold is determined before the preamble signal is received by the receiving station;
    performing further path detection, subsequently to a transmission of a signal indicating an authorization of message signal transmission, by using another threshold for said received preamble signal if paths are detected in said path detection;
    setting information of the paths detected by using said plurality of thresholds for a receiver installed in said receiving station so as to perform a path diversity reception; and
    receiving information data transmitted from said transmitting station by means of said receiver.

2. In a receiving station for receiving a preamble signal transmitted from a transmitting station before transmission of information data from said transmitting station to said receiving station, a communication control method comprising:
    performing path detection by comparing each of a plurality of paths of the preamble signal with a single threshold for the preamble signal from said transmitting station, wherein the single threshold is determined before the preamble signal is received by the receiving station;
    setting up one or more append paths, subsequently to a transmission of a signal indicating an authorization of message signal transmission, which are shifted in time from at least one path among detected paths if the paths are detected in said path detection;
    setting information of said detected paths and said append paths for a receiver installed in said receiving station so as to perform a path diversity reception; and receiving information data transmitted from said transmitting station by means of said receiver.

3. In a receiving station for receiving a preamble signal transmitted from a transmitting station before transmission of information data from said transmitting station to said receiving station, a communication control method comprising:
performing path detection by comparing each of a plurality of paths of the preamble signal with a single threshold for the preamble signal from said transmitting station, wherein the single threshold is determined before the preamble signal is received by the receiving station;
performing further path detection, subsequently to a transmission of a signal indicating an authorization of message signal transmission, by using another threshold for said received preamble signal if paths are detected in said path detection;
setting up one or more append paths which are shifted in time from at least one path among detected paths;
setting information of the paths detected by using said plurality of thresholds and said append paths for a receiver installed in said receiving station so as to perform a path diversity reception; and
receiving information data transmitted from said transmitting station by means of said receiver.

4. In a receiving station for receiving a preamble signal transmitted from a transmitting station before transmission of information data from said transmitting station to said receiving station, a communication control method comprising:
performing path detection by comparing each of a plurality of paths of the preamble signal with a single threshold for the preamble signal from said transmitting station, wherein the single threshold is determined before the preamble signal is received by the receiving station;
setting up one or more append paths, subsequently to a transmission of a signal indicating an authorization of message signal transmission, which are shifted in time from at least one path among detected paths if the paths are detected in said path detection;
performing further path detection by using another threshold for said preamble signal;
setting information of said append paths and the paths detected by using said plurality of thresholds for a receiver installed in said receiving station so as to perform a path diversity reception; and receiving information data transmitted from said transmitting station by means of said receiver.

5. The communication control method according to claim 1, wherein said transmitting station and said receiving station are a mobile station and a wireless base station forming a land mobile communication system, respectively.

6. The communication control method according to claim 1, wherein said transmitting station and said receiving station are wireless terminals forming a wireless LAN (local area network) system, respectively.

7. The communication control method according to claim 1, wherein said receiver performs maximum ratio combining of diversity branches on the basis of said set path information.

8. The communication control method according to claim 1, wherein said preamble signal is a signal for acquiring authorization of transmitting said information data from said transmitting station to said receiving station in a random access communication and wherein said transmitting station transmits said information data when receiving the authorization of the transmission from said receiving station in response to said preamble signal.

9. A wireless communication system having a transmitting station and a receiving station,
wherein said transmitting station comprising:
means for transmitting a preamble signal to said receiving station before transmission of information data from said transmitting station to said receiving station,
wherein said receiving station comprising:
means for performing path detection by comparing each of a plurality of paths of the preamble signal with a single threshold for said preamble signal received from said transmitting station, wherein the single threshold is determined before the preamble signal is received by the receiving station;
means for performing further path detection, subsequently to a transmission of a signal indicating an authorization of message signal transmission, by using another threshold for said received preamble signal if paths are detected in said path detection; and
means for setting information of the paths detected by using said plurality of thresholds for a receiver installed in said receiving station so as to perform a path diversity reception, and
wherein said receiver then receives said information data transmitted from said transmitting station.

10. A wireless communication system having a transmitting station and a receiving station,
wherein said transmitting station comprising:
means for transmitting a preamble signal to said receiving station before transmission of information data from said transmitting station to said receiving station,
wherein said receiving station comprising:
means for performing path detection by, subsequently to a transmission of a signal indicating an authorization of message signal transmission, comparing each of a plurality of paths of the preamble signal with a single threshold for said preamble signal received from said transmitting station,
wherein the single threshold is determined before the preamble signal is received by the receiving station;
means for setting up one or more append paths which are shifted in time from at least one path among detected paths if the paths are detected in said path detection; and
means for setting information of said detected paths and the append paths for a receiver installed in said receiving station so as to perform a path diversity reception, and
wherein said receiver then receives said information data transmitted from said transmitting station.

11. A wireless communication system having a transmitting station and a receiving station,
wherein said transmitting station comprising:
means for transmitting a preamble signal to said receiving station before transmission of information data from said transmitting station to said receiving station,
wherein said receiving station comprising:
means for performing path detection by comparing each of a plurality of paths of the preamble signal with a single threshold for said preamble signal received from said transmitting station, wherein the single threshold is determined before the preamble signal is received by the receiving station
means for performing further path detection by using another threshold for said received preamble signal if paths are detected in said path detection;
means for setting up one or more append paths, subsequently to a transmission of a signal indicating an authorization of message signal transmission, which are shifted in time from at least one path among paths detected by using said plurality of thresholds; and means for setting information of the paths detected by using said plurality of thresholds and said append paths for a receiver installed in said receiving station so as to perform a path diversity reception, and wherein said receiver then receives said information data transmitted from said transmitting station.

12. A wireless communication system having a transmitting station and a receiving station, wherein said transmitting station comprising:

means for transmitting a preamble signal to said receiving station before transmission of information data from said transmitting station to said receiving station, wherein said receiving station comprising:

means for performing path detection by comparing each of a plurality of paths of the preamble signal with a single threshold for said preamble signal received from said transmitting station, wherein the single threshold is determined before the preamble signal is received by the receiving station;

means for setting up one or more append paths, subsequently to a transmission of a signal indicating an authorization of message signal transmission, which are shifted in time from at least one path among detected paths if the paths are detected in said path detection;

means for performing further path detection by using another threshold for said received preamble signal; and means for setting information of said append paths and said paths detected by using said plurality of thresholds for a receiver installed in said receiving station so as to perform a path diversity reception, and wherein said receiver then receives said information data transmitted from said transmitting station.

13. The wireless communication system according to claim 9, wherein said transmitting station and said receiving station are a mobile station and a wireless base station forming a land mobile communication system, respectively.

14. The wireless communication system according to claim 9, wherein said transmitting station and said receiving station are wireless terminals forming a wireless LAN system, respectively.

15. The wireless communication system according to claim 9, wherein said receiver performs maximum ratio combining of diversity branches on the basis of said set path information.

16. The wireless communication system according to claim 9, wherein said preamble signal is a signal for acquiring authorization of transmitting said information data from said transmitting station to said receiving station in a random access communication and wherein said transmitting station transmits said information data when receiving the authorization of the transmission from said receiving station in response to said preamble signal.

17. A communication control method for a mobile communication system using a random access for one of uplink channels from a mobile station to a base station, comprising:

in said mobile station, transmitting a preamble signal for acquiring authorization of message signal transmission; in said base station, performing path detection by comparing each of a plurality of paths of the preamble signal with a single preamble threshold for a path of said preamble signal from said mobile station, and, if a path exceeding said single preamble threshold is detected and the message signal can be received, transmitting a signal indicating the authorization of message signal transmission to said mobile station, wherein the single preamble threshold is determined before the preamble signal is received by the base station;

subsequently to the transmission of said signal indicating the authorization of message signal transmission, performing path detection by using another preamble threshold for the paths of said previously received preamble signal;

setting information of the paths detected by using said preamble thresholds for a receiver installed in said receiving station so as to perform a path diversity reception; and receiving the message signal transmitted from said mobile station by means of said receiver.

18. The communication control method according to claim 17, wherein said single preamble threshold is higher than or equal to said another preamble threshold.

19. A communication control method for a mobile communication system using a random access for one of uplink channels from a mobile station to a base station, comprising:

in said mobile station, transmitting a preamble signal for acquiring authorization of message signal transmission; in said base station, performing path detection by comparing each of a plurality of paths of the preamble signal with a single preamble threshold for a path of said preamble signal from said mobile station, and, if a path exceeding said single preamble threshold is detected and the message signal can be received, transmitting a signal indicating the authorization of message signal transmission to said mobile station, wherein the single preamble threshold is determined before the preamble signal is received by the base station;

setting up one or more append paths, subsequently to the transmission of the signal indicating the authorization of message signal transmission, which are shifted in time from at least one path among said detected paths;

setting information of said detected paths and said append paths for a receiver installed in said receiving station so as to perform a path diversity reception; and receiving the message signal from said mobile station by means of said receiver.

20. The communication control method according to claim 17, further comprising providing append paths which are shifted in time from at least one path among said detected paths in said base station and setting path information of said detected paths and said append paths to said path diversity receiver.

21. A mobile communication system using a random access for one of uplink channels from a mobile station to a base station, wherein said mobile station comprises:

means for transmitting a preamble signal for acquiring authorization of message signal transmission; and means for transmitting a message signal to said base station when receiving a signal indicating the authorization of message signal transmission from said base station, wherein said base station having a plurality of preamble thresholds comprises:

means for performing path detection by comparing each of a plurality of paths of the preamble signal with a single preamble threshold for a path of said preamble signal from said mobile station, and, if a path exceeding said single preamble threshold is detected and the message signal can be received, transmitting a signal indicating the authorization of message signal transmission to said mobile station, wherein the single preamble threshold is determined before the preamble signal is received by the base station;

subsequently to the transmission of said signal indicating the authorization of message signal transmission, performing path detection by using another preamble threshold for the paths of said previously received preamble signal; and setting information of the paths detected by using said plurality of preamble thresholds for a receiver installed in said receiving station so as to perform a path diversity reception; and wherein said receiver receives the message signal from said mobile station.

22. The mobile communication system according to claim 21, wherein said single preamble threshold is higher than or equal to said another preamble threshold.

23. A mobile communication system using a random access for one of uplink channels from a mobile station to a base station, wherein said mobile station comprises:

means for transmitting a preamble signal indicating a request for authorization of message signal transmission; and means for transmitting the message signal to said base station when receiving a signal indicating authorization of message signal transmission from said base station, wherein said base station comprises:

means for performing path detection by comparing each of a plurality of paths of the preamble signal with a single preamble threshold for a path of said preamble signal from said mobile station, and, if a path exceeding said single preamble threshold is detected and the message signal can be received, transmitting a signal indicating the authorization of message signal transmission to said mobile station, wherein the single preamble threshold is determined before the preamble signal is received by the receiving station;

means for providing append paths, subsequently to the transmission of the signal indicating the authorization of message signal transmission, which are shifted in time from at least one path among said detected paths; and means for setting path information of said detected paths and said append paths for a receiver installed in said receiving station so as to perform a path diversity reception; and wherein said receiver receives the message signal from said mobile station.

24. The mobile communication system according to claim 21, wherein said base station has means for setting path information with at least one path among said detected paths provided with the append paths to said path diversity receiver.

25. A mobile communication system using a random access for one of uplink channels from a mobile station to a base station, wherein said mobile station comprises:

means for transmitting a preamble signal for acquiring authorization of message signal transmission; and means for transmitting a message signal to said base station when receiving a signal indicating the authorization of message signal transmission from said base station, wherein said base station having a plurality of preamble thresholds comprises:

means for performing path detection by comparing each of a plurality of paths of the preamble signal with a single preamble threshold for a path of said preamble signal from said mobile station, and, if a path exceeding said single preamble threshold is detected and the message signal can be received, transmitting a signal indicating the authorization of message signal transmission to said mobile station;

subsequently to the transmission of said signal indicating the authorization of message signal transmission, performing path detection by using another preamble threshold for the paths of said previously received preamble signal; and setting information of the paths detected by using said plurality of preamble thresholds for a receiver installed in said receiving station so as to perform a path diversity reception, wherein said receiver receives the message signal from said mobile station, and wherein a baseband signal processing unit of said base station comprises:

a path detector receiving an input of a received baseband signal demodulated by a demodulator;

a rake receiver receiving an input of said received baseband signal;

a control unit for exchanging control information and send/receive data with a host device; and a code generator receiving an input of code generation information from said control unit and outputting a transmitted baseband signal to a modulator, wherein said path detector measures a cross correlation between the input received baseband signal and code sequences forming said preamble signal previously determined to be used with the mobile station and detects as a path a portion where a correlation value or a power level is the maximum, the path detector comprising means for performing threshold processing by using a first preamble threshold for the detected path and notifying said control unit of a result of the threshold processing as preamble signal detection information, wherein said control unit comprises means for receiving said preamble signal detection information and supplying code generation information to said code generator, wherein said code generator comprises means for generating code sequences forming an acknowledgement signal indicating authorization of a message transmission or a negative acknowledgement signal indicating an impossible message transmission on the basis of said code generation information from said control unit and transmitting it as a transmitted baseband signal to said modulator, wherein, subsequently to the transmission of said acknowledgement signal, said path detector performs path detection again by using a second preamble threshold lower than or equal to said first preamble threshold and notifies said rake receiver of the path information of paths clearing said second preamble threshold, and wherein said rake receiver sets delays of the path information from said path detector to correlators forming rake fingers of said rake receiver, demodulates the message signal from said received baseband signal, and transmits the demodulated message signal as message data to said control unit.

26. A mobile communication system using a random access for one of uplink channels from a mobile station to a base station, wherein said mobile station comprises:

means for transmitting a preamble signal indicating a request for authorization of message signal transmission; and means for transmitting the message signal to said base station when receiving a signal indicating authorization of message signal transmission from said base station, wherein said base station comprises:
means for performing path detection by comparing each of a plurality of paths of the preamble signal with a single preamble threshold for a path of said preamble signal from said mobile station, and, if a path exceeding said single preamble threshold is detected and the message signal can be received, transmitting a signal indicating the authorization of message signal transmission to said mobile station;
   means for providing append paths which are shifted in time from at least one path among said detected paths; and
   means for setting path information of said detected paths and said append paths for a receiver installed in said receiving station so as to perform a path diversity reception; and
   wherein said receiver receives the message signal from said mobile station, wherein a baseband signal processing unit of said base station comprises:
   a path detector receiving an input of a received baseband signal demodulated by a demodulator;
   a rake receiver receiving an input of said received baseband signal;
   a control unit for exchanging control information and send/receive data with a host device; and
   a code generator receiving an input of code generation information from said control unit and outputting a transmitted baseband signal to a modulator,
wherein said path detector measures a cross correlation between the input received baseband signal and code sequences forming said preamble signal previously determined to be used with the mobile station and detects as a path a portion where a correlation value or a power level is the maximum, the path detector comprising means for performing threshold processing by using a preamble threshold for the detected path and notifying said control unit of a result of the threshold processing as preamble signal detection information,
   wherein said control unit comprises means for receiving said preamble signal detection information and supplying code generation information to said code generator,
   wherein said code generator comprises means for generating code sequences forming an acknowledgement signal indicating authorization of a message transmission or a negative acknowledgement signal indicating an impossible message transmission on the basis of said code generation information from said control unit and transmitting it as a transmitted baseband signal to said modulator,
   wherein, said path detector comprises means for adding one or more append paths which are shifted in time from at least one path among paths clearing said preamble threshold determination and notifying said rake receiver of the path information of said paths clearing said preamble threshold determination and said append paths to said rake receiver, subsequently to the transmission of said acknowledgement signal, and
   wherein said rake receiver sets delays of said path information from said path detector to correlators forming rake fingers of said rake receiver, demodulates the message signal from said received baseband signal, and transmits the demodulated message signal as message data to said control unit.

27. The mobile communication system according to claim 21, wherein said path detector adds one or more append paths which are shifted in time from at least one path among the paths clearing said preamble thresholds and notifies said rake receiver of their path information.

28. A receiving station for performing a wireless communication with a transmitting station, comprising:
   means for receiving a preamble signal transmitted from said transmitting station before transmission of information data from said transmitting station to said receiving station and performing path detection by comparing each of a plurality of paths of the preamble signal with a single threshold for said preamble signal, wherein the single threshold is determined before the preamble signal is received by the receiving station;
   means for performing further path detection, subsequently to a transmission of a signal indicating an authorization of message signal transmission, by using another threshold for said received preamble signal if a path is detected; and
   means for setting path information of the path detected by using said another threshold for a receiver installed in said receiving station so as to perform a path diversity reception,
   wherein said receiver then receives the information data transmitted from said transmitting station.

29. A receiving station for performing a wireless communication with a transmitting station, comprising:
   means for receiving a preamble signal transmitted from said transmitting station before transmission of information data from said transmitting station to said receiving station and performing path detection by comparing each of a plurality of paths of the preamble signal with a single threshold for said preamble signal,
   wherein the single threshold is determined before the preamble signal is received by the receiving station;
   means for setting up one or more append paths, subsequently to a transmission of a signal indicating an authorization of message signal transmission, which are shifted in time from at least one path among detected paths if the paths are detected in said path detection; and
   means for setting path information of said detected paths and said append paths for a receiver installed in said receiving station so as to perform a path diversity reception,
   wherein said receiver then receives the information data transmitted from said transmitting station.

30. The receiving station according to claim 28, further comprising means for setting up one or more append paths which are shifted in time from at least one path among the detected paths and means for setting path information of the paths and said append paths to said receiver for performing the path diversity reception.

31. A base station for a mobile communication system using a random access for one of uplink channels from a mobile station to the base station, having a plurality of preamble thresholds, comprising:
   means for performing path detection by comparing each of a plurality of paths of the preamble signal with a single preamble threshold for a path of a preamble signal for conveying a request for a message signal transmission from said mobile station to said base station and, if a path exceeding said single preamble threshold is detected and a message signal can be received, transmitting a signal indicating authorization of message signal transmission to said mobile station,
   wherein the single preamble threshold is determined before the preamble signal is received by the base station;

means for performing path detection by using another preamble threshold for the paths of the previously received preamble signal subsequently to said transmission of the signal indicating the authorization of the message signal transmission; and means for setting information of the paths detected by using said preamble thresholds for a receiver installed in said base station so as to perform a path diversity reception, and wherein said receiver receives the message signal from said mobile station.

32. A base station for a mobile communication system using a random access for one of uplink channels from a mobile station to the base station, comprising:

means for performing path detection by comparing each of a plurality of paths of the preamble signal with a single preamble threshold for a path of a preamble signal for conveying a request for a message signal transmission from said mobile station to said base station and, if a path exceeding said single preamble threshold is detected and a message signal can be received, transmitting a signal indicating authorization of message signal transmission to said mobile station, wherein the single preamble threshold is determined before the preamble signal is received by the receiving station;

means for providing append paths, subsequently to the transmission of the signal indicating the authorization of message signal transmission, which are shifted in time from at least one path among the detected paths; and means for setting path information of said detected paths and said append paths for a receiver installed in said base station so as to perform a path diversity reception, and wherein said receiver receives the message signal from said mobile station.

33. A base station, comprising:

a path detector receiving an input of a received baseband signal demodulated by a demodulator;

a rake receiver receiving an input of said received baseband signal;

a control unit for exchanging control information and send/receive data with a host device; and a code generator receiving an input of code generation information from said control unit and outputting a transmitted baseband signal to a modulator, wherein said path detector measures a cross correlation between the input received baseband signal and code sequences forming a preamble signal previously determined to be used with the mobile station and detects as a path a portion where a correlation value or a power level is the maximum, the path detector comprising means for performing threshold processing by comparing each of a plurality of paths of the preamble signal with a first preamble threshold for the detected path and notifying said control unit of a result of the threshold processing as preamble signal detection information, wherein the first preamble threshold is determined before the preamble signal is received by the base station, wherein said control unit comprises means for receiving said preamble signal detection information and transmitting code generation information to said code generator, wherein said code generator comprises means for generating code sequences forming an acknowledgement signal indicating authorization of a message transmission or a negative acknowledgement signal indicating an impossible message transmission on the basis of said code generation information from said control unit and transmitting it as a transmitted baseband signal to said modulator, wherein, subsequently to the transmission of said acknowledgement signal, said path detector performs threshold processing again for the detected path by using a second preamble threshold lower than or equal to said first preamble threshold and notifies said rake receiver of the path information of paths clearing said second preamble threshold, and wherein said rake receiver sets delays of the path information to correlators forming said rake receiver, demodulates the message signal from said received baseband signal, and transmits the demodulated message signal as message data to said control unit.

34. A base station, comprising:

a path detector receiving an input of a received baseband signal demodulated by a demodulator;

a rake receiver receiving an input of said received baseband signal;

a control unit for exchanging control information and send/receive data with a host device; and a code generator receiving an input of code generation information from said control unit and outputting a transmitted baseband signal to a modulator, wherein said path detector measures a cross correlation between the input received baseband signal and code sequences forming a preamble signal previously determined to be used with the mobile station and detects as a path a portion where a correlation value or a power level is the maximum, the path detector comprising means for performing threshold processing by comparing each of a plurality of paths of the preamble signal with a preamble threshold for the detected path and notifying said control unit of a result of the threshold processing as preamble signal detection information, wherein the preamble threshold is determined before the preamble signal is received by the base station, wherein said control unit comprises means for receiving said preamble signal detection information and transmitting code generation information to said code generator, wherein said code generator comprises means for generating code sequences forming an acknowledgement signal indicating authorization of a message transmission or a negative acknowledgement signal indicating an impossible message transmission on the basis of said code generation information from said control unit and transmitting it as a transmitted baseband signal to said modulator, wherein said path detector comprises means for adding append paths to paths clearing the preamble threshold determination and notifying said rake receiver of their path information, subsequently to the transmission of said acknowledgement signal, and wherein said rake receiver sets delays of said path information to correlators forming said rake receiver, demodulates the message signal from said received baseband signal, and transmits the demodulated message signal as message data to said control unit.

35. The base station according to claim 33, wherein said path detector adds a plurality of append paths which are shifted in time from the path clearing said preamble threshold determination and notifies said rake receiver of their path information.

36. The communication control method according to claim 2, wherein said transmitting station and said receiving station are a mobile station and a wireless base station forming a land mobile communication system, respectively.

37. The communication control method according to claim 3, wherein said transmitting station and said receiving station are a mobile station and a wireless base station forming a land mobile communication system, respectively.

38. The communication control method according to claim 4, wherein said transmitting station and said receiving station are a mobile station and a wireless base station forming a land mobile communication system, respectively.

39. The communication control method according to claim 2, wherein said transmitting station and said receiving station are wireless terminals forming a wireless LAN (local area network) system, respectively.

40. The communication control method according to claim 3, wherein said transmitting station and said receiving station are wireless terminals forming a wireless LAN (local area network) system, respectively.

41. The communication control method according to claim 4, wherein said transmitting station and said receiving station are wireless terminals forming a wireless LAN (local area network) system, respectively.

42. The communication control method according to claim 2, wherein said receiver performs maximum ratio combining of diversity branches on the basis of said set path information.

43. The communication control method according to claim 3, wherein said receiver performs maximum ratio combining of diversity branches on the basis of said set path information.

44. The communication control method according to claim 4, wherein said receiver performs maximum ratio combining of diversity branches on the basis of said set path information.

45. The communication control method according to claim 2, wherein said preamble signal is a signal for acquiring authorization of transmitting said information data from said transmitting station to said receiving station in a random access communication and wherein said transmitting station transmits said information data when receiving the authorization of the transmission from said receiving station in response to said preamble signal.

46. The communication control method according to claim 3, wherein said preamble signal is a signal for acquiring authorization of transmitting said information data from said transmitting station to said receiving station in a random access communication and wherein said transmitting station transmits said information data when receiving the authorization of the transmission from said receiving station in response to said preamble signal.

47. The communication control method according to claim 4, wherein said preamble signal is a signal for acquiring authorization of transmitting said information data from said transmitting station to said receiving station in a random access communication and wherein said transmitting station transmits said information data when receiving the authorization of the transmission from said receiving station in response to said preamble signal.

48. The wireless communication system according to claim 10, wherein said transmitting station and said receiving station are a mobile station and a wireless base station forming a land mobile communication system, respectively.

49. The wireless communication system according to claim 11, wherein said transmitting station and said receiving station are a mobile station and a wireless base station forming a land mobile communication system, respectively.

50. The wireless communication system according to claim 12, wherein said transmitting station and said receiving station are a mobile station and a wireless base station forming a land mobile communication system, respectively.

51. The wireless communication system according to claim 10, wherein said transmitting station and said receiving station are wireless terminals forming a wireless LAN system, respectively.

52. The wireless communication system according to claim 11, wherein said transmitting station and said receiving station are wireless terminals forming a wireless LAN system, respectively.

53. The wireless communication system according to claim 12, wherein said transmitting station and said receiving station are wireless terminals forming a wireless LAN system, respectively.

54. The wireless communication system according to claim 10, wherein said receiver performs maximum ratio combining of diversity branches on the basis of said set path information.

55. The wireless communication system according to claim 11, wherein said receiver performs maximum ratio combining of diversity branches on the basis of said set path information.

56. The wireless communication system according to claim 12, wherein said receiver performs maximum ratio combining of diversity branches on the basis of said set path information.

57. The wireless communication system according to claim 10, wherein said preamble signal is a signal for acquiring authorization &transmitting said information data from said transmitting station to said receiving station in a random access communication and wherein said transmitting station transmits said information data when receiving the authorization of the transmission from said receiving station in response to said preamble signal.

58. The wireless communication system according to claim 11, wherein said preamble signal is a signal for acquiring authorization of transmitting said information data from said transmitting station to said receiving station in a random access communication and wherein said transmitting station transmits said information data when receiving the authorization of the transmission from said receiving station in response to said preamble signal.

59. The wireless communication system according to claim 12, wherein said preamble signal is a signal for acquiring authorization &transmitting said information data from said transmitting station to said receiving station in a random access communication and wherein said transmitting station transmits said information data when receiving the authorization of the transmission from said receiving station in response to said preamble signal.

60. The communication control method according to claim 18, further comprising providing append paths which are shifted in time from at least one path among said detected paths in said base station and setting path information of said detected paths and said append paths to said path diversity receiver.

61. The mobile communication system according to claim 22, wherein said base station has means for setting path information with at least one path among said detected paths provided with the append paths to said path diversity receiver.

62. The base station according to claim 34, wherein said path detector adds a plurality of append paths which are shifted in time from the path clearing said preamble threshold determination and notifies said rake receiver of their path information.

* * * * *

UNITED STATES PATENT AND TRADEMARK OFFICE
CERTIFICATE OF CORRECTION

PATENT NO. : 7,738,889 B2
APPLICATION NO. : 10/467859
DATED : June 15, 2010
INVENTOR(S) : Suguru Nakada It is certified that error appears in the above-identified patent and that said Letters Patent is hereby corrected as shown below:

Column 7, between lines 32 and 33, insert the following paragraph --An input to a path detector 203 and a rake receiver 206 is a received baseband signal 201 demodulated by a demodulator (not shown)--.

Signed and Sealed this

Sixteenth Day of November, 2010

David J. Kappos
*Director of the United States Patent and Trademark Office*